United States Patent [19]

Farham

[11] Patent Number: 5,593,049
[45] Date of Patent: Jan. 14, 1997

[54] SUPPORT STRUCTURE WITH WIRING

[76] Inventor: Howden W. Farham, 69 Grey Avenue, Table View, Cape Province, South Africa

[21] Appl. No.: 109,314

[22] Filed: Aug. 19, 1993

[30] Foreign Application Priority Data

Aug. 19, 1992 [ZA] South Africa ............................ 92/6242

[51] Int. Cl.⁶ .................................................. A47B 57/00
[52] U.S. Cl. .................................. 211/193; 211/1; 174/48
[58] Field of Search ...................................... 211/187, 189, 211/186–191, 193, 1.5; 439/110–120; 174/48; 52/220.1

[56] References Cited

U.S. PATENT DOCUMENTS

| | | | |
|---|---|---|---|
| 1,962,554 | 6/1954 | De Mask | 439/113 |
| 3,602,472 | 8/1971 | Smyth-Tyrrell | 211/187 X |
| 4,570,402 | 2/1986 | Johnson | 211/187 X |
| 4,973,796 | 11/1990 | Dougherty | 174/48 |
| 5,007,222 | 4/1991 | Raymond | 52/220.1 X |
| 5,277,393 | 1/1994 | Nicholson et al. | 211/187 X |
| 5,279,430 | 1/1994 | Benton | 211/187 X |

*Primary Examiner*—Blair Johnson
*Attorney, Agent, or Firm*—Ladas & Parry

[57] ABSTRACT

A support structure of the kind used in supermarkets and other self-service shops comprises a series of slotted upright members 12 and brackets 16 which are connected to the upright members by having teeth which enter into the slots. Conductor tracks 36 extend along passages 32 in the upright members, and electrical contact with conductors carried by the conductor tracks is established by means of electrical connectors 48 having tongues 50 which enter into the passages through slots which are unoccupied by teeth.

8 Claims, 4 Drawing Sheets

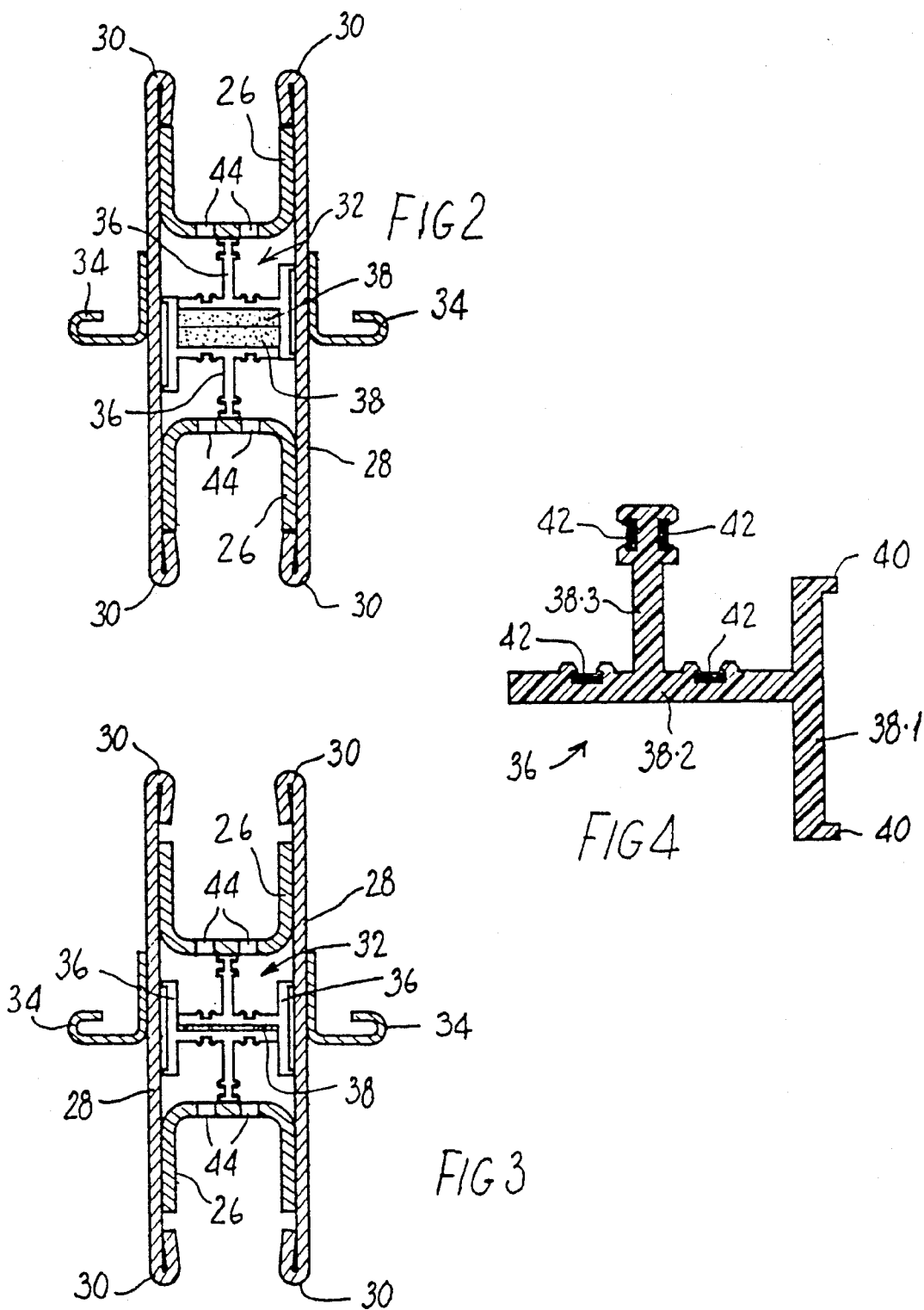

SUPPORT STRUCTURE WITH WIRING

FIELD OF THE INVENTION

THIS INVENTION relates to support structures which are provided with wiring for carrying power and/or signalling to or from equipment associated with the support structure.

More particularly, it relates to support structures of the kind comprising a slotted U-section channel which defines a passage along the channel, and brackets which have teeth and are connected to the channel by the teeth entering, through slots in the channel, into said passage.

SUMMARY OF THE INVENTION

According to the invention there is provided a support structure which comprises an elongate slotted member defining a passage along the member and having slots therein at regularly spaced intervals, brackets which have teeth and are connected to the member by the teeth entering into the passage through the slots, and a conductor for carrying power and/or signalling to or from electrical equipment associated with the support structure, the conductor running along the passage.

There may be electrical contact with the conductor through a said slot which is unoccupied by a said tooth.

There may be a plug-in electrical connector having a tongue which enters into the passage through a said slot which is unoccupied by a said tooth, the tongue carrying a terminal whereby electrical contact is established with the conductor.

The elongate slotted member may comprise a slotted U-section channel having two rows of slots therein, the slots being arranged in laterally spaced pairs, in which event the electrical connector may have a pair of said tongues each entering into the passage through a corresponding one of the slots of a said pair of slots.

The support structure may further comprises a conductor support extending along the passage, the conductor support being of an extruded material, and the conductor being supported by the conductor support.

In one form of the invention the elongate slotted member comprises a pair of oppositely facing slotted U-section channels each having two rows of slots therein and the slots of each member being arranged in laterally spaced pairs, and a pair of side panels joining the U-section channels to form a four-sided passage with the U-section channels being on opposite sides of the passage, the electrical connector having a pair of said tongues each entering into the passage through a corresponding one of the slots of a said pair of slots.

The support structure may in this event further comprise a pair of conductor supports extending along the passage, the conductor supports each being of an extruded material and each carrying a said conductor, and a resiliently compressible material between the conductor supports and urging the conductor supports in opposite directions towards the corresponding U-section channels.

The invention extends to a method of providing a support structure with a conductor for carrying power and/or signalling to or from equipment associated with the support structure, which support structure comprises an elongate slotted member defining a passage along the member and having slots therein at regularly spaced intervals, and brackets which have teeth and are connected to the member by the teeth entering into the passage through the slots, the method comprising inserting the conductor into the passage from an open end of the passage, and establishing contact with the conductor by entering a connector into the passage through a said slot which is not occupied by a said tooth.

The invention will now be described in more detail, by way of example, with reference to the accompanying drawings.

BRIEF DESCRIPTION OF THE DRAWINGS

In the drawings:

FIGS. 2 and 3 are two horizontal sections through the support structure, showing the effect of manufacturing tolerances;

FIG. 4 is a cross-section of a conductor track forming part of the wiring;

DETAILED DESCRIPTION OF PREFERRED EMBODIMENTS

Figure 1:
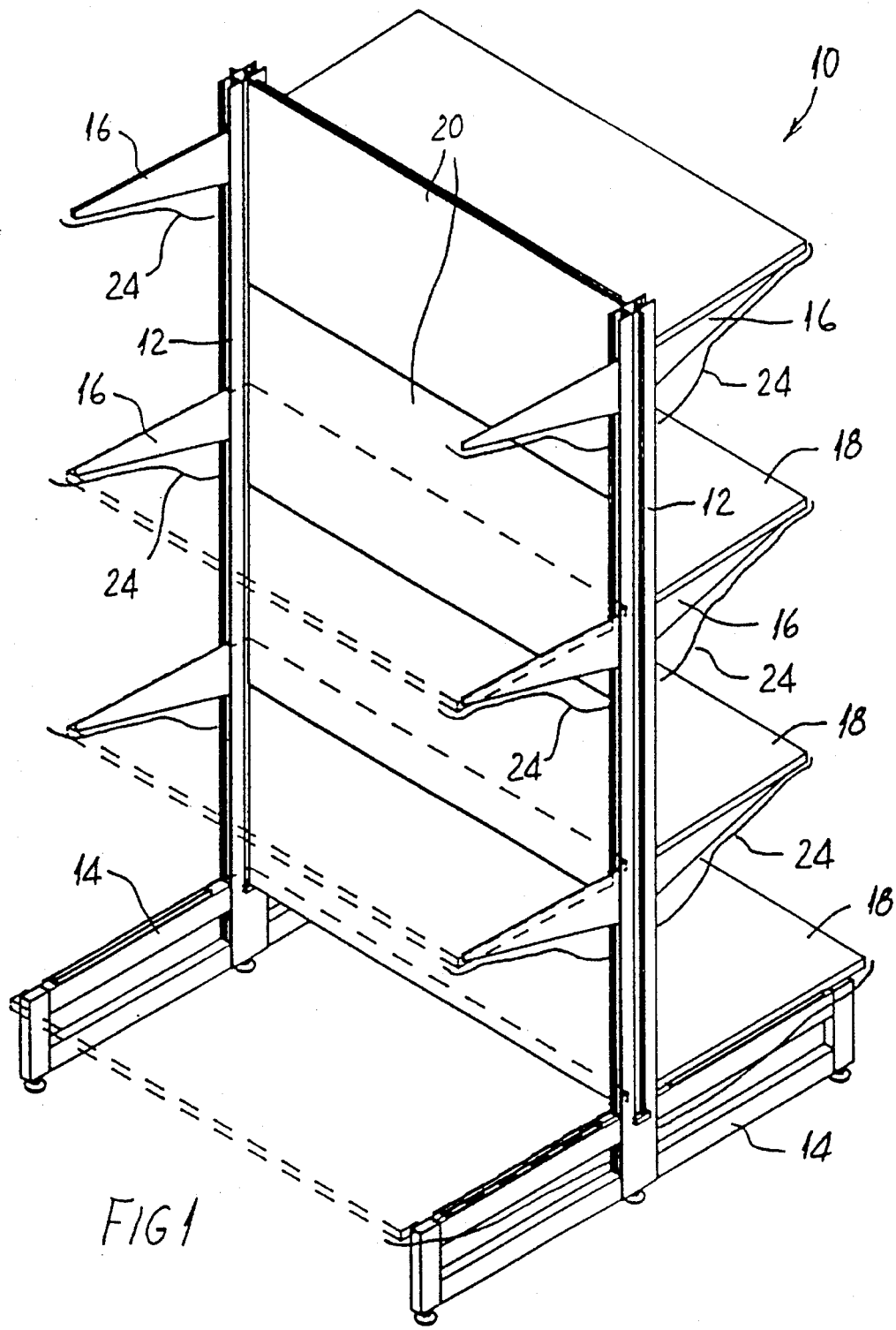
FIG. 1 is a three dimensional view of a support structure in accordance with the invention.

Referring first to FIG. 1, reference numeral 10 generally indicates a support structure in the form of shelving of the kind used in supermarkets and other self service shops. The structure comprises a series of upright members 12 (only two of which are shown), each mounted on its own base 14, brackets 16 connected to the upright members, shelves 18 supported on the brackets, and, between each pair of adjacent upright members, a series of superimposed back panels 20. The back panels 20 serve to separate the shelves 18 on one side of the structure from the shelves on the other side of the structure, and also provide lateral support for the upright members 12.

Electronic display devices (not shown) for providing information such as, for example, prices of goods, to customers are mounted along the edges of the shelves 18. These devices require power for their operation and must also be connected to a central data processor for the interchange of data with the data processor. This is done by wiring which, in accordance with the invention, includes conductors which run along passages in the upright members 12, as will be described in more detail hereinafter, with reference to FIGS. 2 to 5. A feed cable (not shown) which extends down from the ceiling of the building in which the shelving is housed, enters into one of the upright members 12 that is at an end of the structure 10, and extends down the member to the bottom thereof. Near the bottom the feed cable leaves the member through an opening in the side of the member and then extends horizontally along the length of the structure 10. At each of the other upright members 12 a branch connection leads from the feed cable, and this is connected to conductor tracks in that member by means of a connector, in a manner that will be described in more detail hereinafter.

The display devices are connected to the conductor tracks by means of ribbon cables 24 which each have a connector at the end thereof, in a manner that will be described in more detail hereinafter, with reference to FIG. 5.

Referring now to FIGS. 2 and 3, it will be seen that each upright member 12 comprises a pair of slotted U-section channels 26 arranged back-to-back and joined by a pair of side panels 28 with rolled edges 30. The channels 26 and the side panels 28 together define a passage 32 which extends along the channels.

The side panels 28 are welded to the channels 26. As the jigging that is used when welding these components together is not always very accurate, the distance between the channels 26 is not consistently the same, as will become evident when FIG. 3 is compared with FIG. 2. The distance between the side panels 28, however, does not vary significantly. On the outside of each of the side panels 28 there is an angle section element which has a folded back lip 34, whereby the back panels 20 can be engaged with the upright member.

Extending along the passage 32 of each of the upright members 12 except the one through which the feed cable passes, there are two conductor supports or tracks 36 arranged back-to-back. One or more strips of polyurethane foam 38 are placed between the conductor tracks. These strips urge the conductor tracks away from one another against the rear faces of the channels 26, and serve to accommodate differences in the spacing between the channels. As can best be seen in FIG. 4, each of the conductor tracks 6 comprises a first portion 38.1 which, when the conductor track is in position in the passage 32, lies against a corresponding one of the side panels 28, a second portion 38.2 which extends at right angles to the side plate 28, and a third portion 38.3 which extends at right angles to the second portion 38.2. The portions 38.1, 38.2, and 38.3 are conveniently constituted by a plastics extrusion. Alternatively the portions may be constituted by an aluminium extrusion, in which event the extrusion may be hard anodised so that the anodising can provide the necessary insulation. Alternatively, where the portions are constituted by an aluminium extrusion, thin strips of plastics material may be inserted between the conductors and the aluminium so as to insulate the conductors from the aluminium.

The first portion 38.1 is provided with a pair of narrow ridges 40 which are easily deformed, and provided to compensate for any variations in the distance between the side panels 28.

In the second portion 38.2 there are a pair of channels, each of which accommodates a conductor 42 which extends along the length of the conductor track. Likewise, the third portion 38.3 is provided with a pair of channels, each of which accommodates a conductor 42 that extends along the length of the conductor track.

Figure 5:
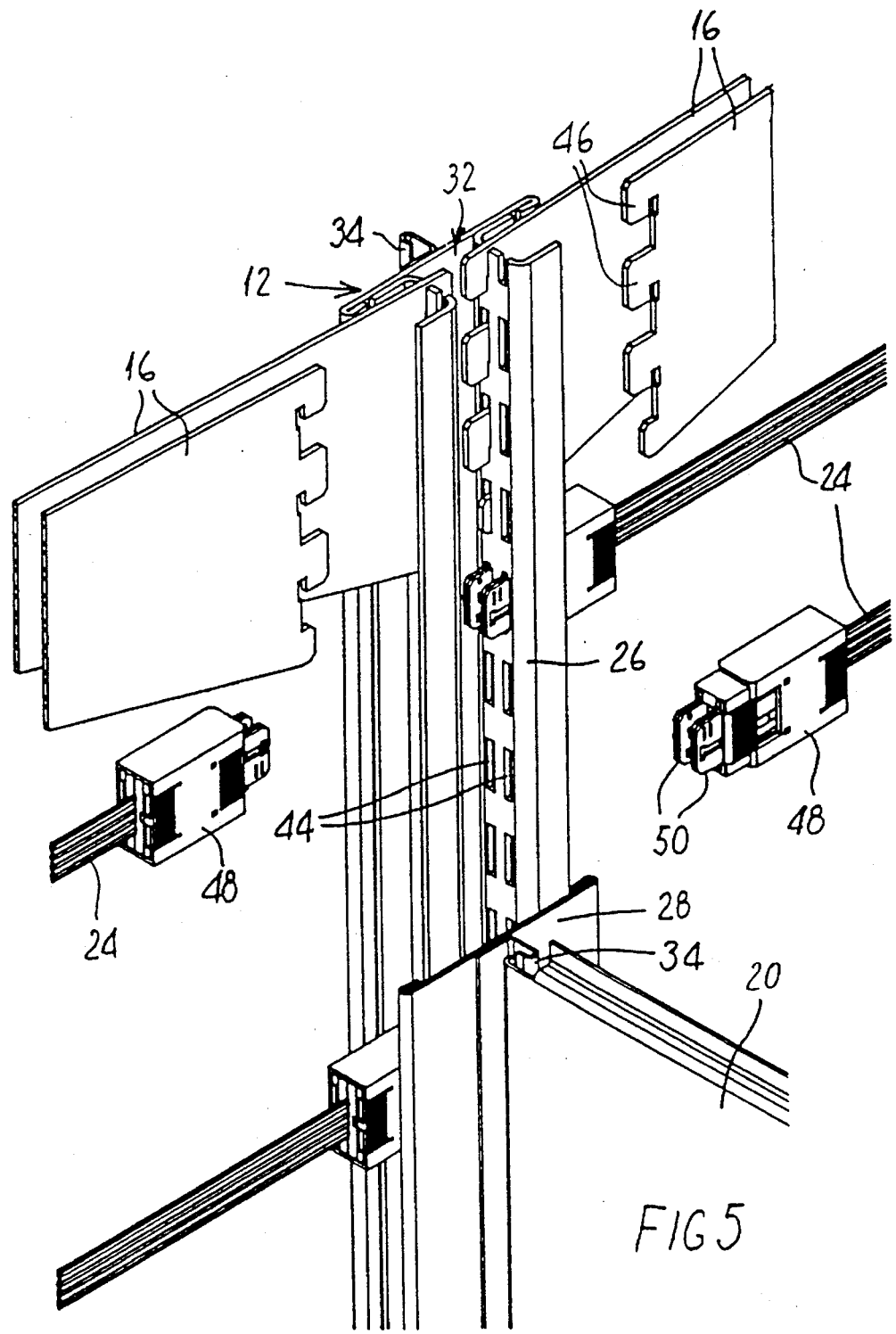
FIG. 5 is an exploded three-dimensional view of various parts of the support structure.

Referring now to FIG. 5, it will be seen that each of the channels 26 has two rows of slots 44 therein. The brackets 16 have teeth 46 which can enter via the slots 44 into the passage 32, to connect the bracket securely to the channel 26. The arrangement of the conductor tracks 36 is such that they do not interfere with entry of the teeth 46 into the passage 32.

The connectors referred to earlier are indicated in FIG. 5 by reference numeral 48. Each of them has a pair of rectangular tongues 50 whose size and spacing is such that they can enter through an adjacent pair of the slots 44 into the passage 32. The tongues 50 carry terminals whereby electrical contact can be established with the conductors 42. The branch connections referred to earlier, and also the ribbon cables 24 are connected to the conductor tracks 36 by means of such connectors 48. The connectors whereby the branch connections are connected to the conductor tracks may be fused connectors.

The conductor tracks 36 are installed by inserting them from the top end into the passage 32 and sliding them, with the strip or strips 38 therebetween, down along the passage until they are in position. A major advantage of this procedure is that the wiring can be installed without requiring unpacking of the shelves 18, and without the need for installing cable trunking to protect the wiring from damage by goods packed on the shelves or by being pinched between the shelves and the back panels 20 or upright members 12. The conductor tracks are well protected inside the upright members 12.

It will be noted that the conductors 42 on the portion 38.3 are relatively close to the channels 26. This will ensure that the teeth 46 do not come into contact with the conductors should the brackets 16 be swung from side to side.

Figure 6:
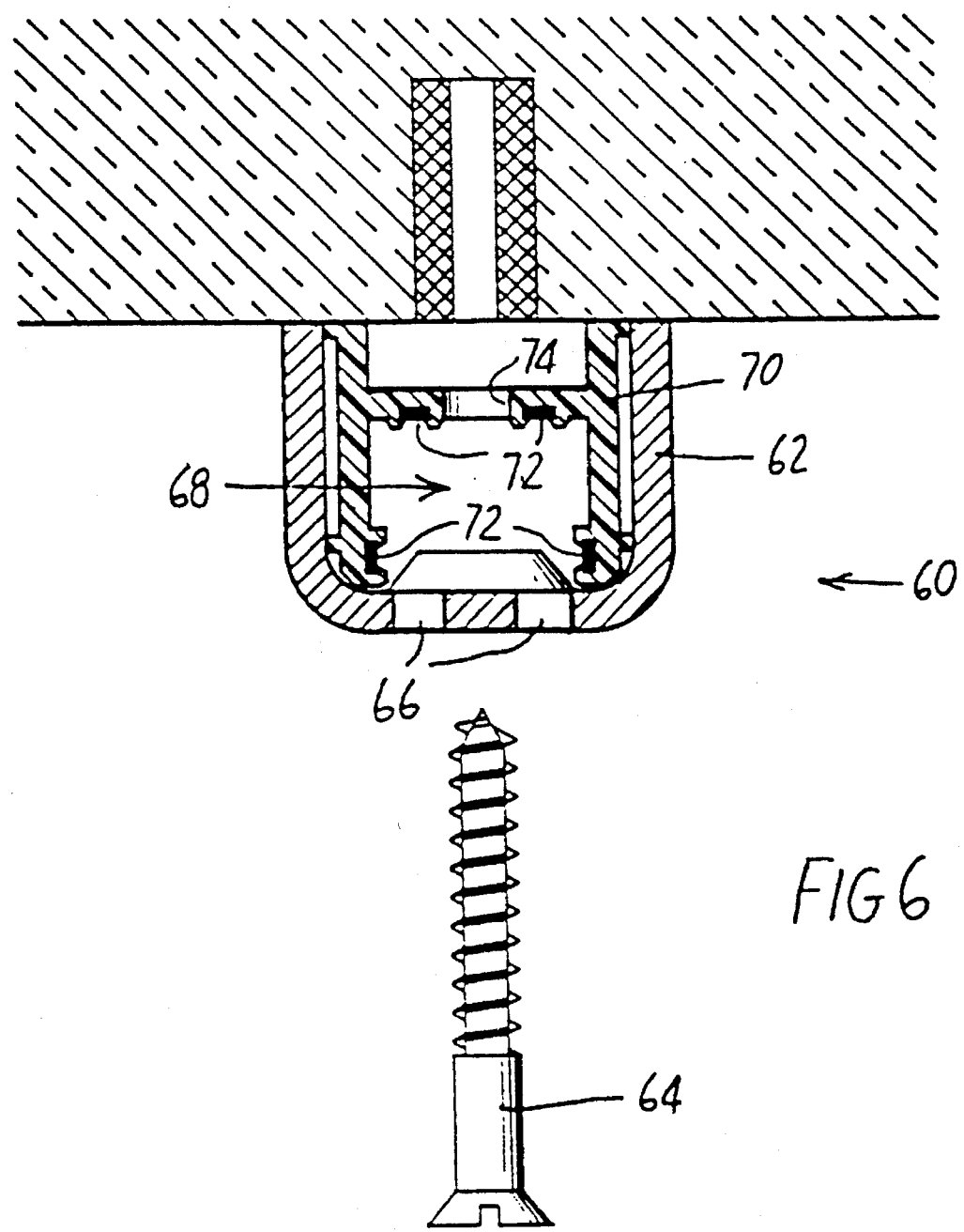
FIG. 6 is a horizontal section through an alternative form of support structure in accordance with the invention.

Referring now to FIG. 6, there is shown a support structure 60 which comprises a slotted U-section channel 62 which is secured to a wall by means of a screw 64. The channel 62 is of the same type as the channels 26 of the FIGS. 1 to 5 embodiment, having two rows of slots 66 therein. Brackets (not shown) similar to the brackets 16 shown in FIGS. 1 and 5 engage with the channel 62. The channel 62 defines a passage 68, along which there extends a conductor track 70 comprising an extrusion having channels in which conductors 72 are laid. In the conductor track there is an opening 74 for receiving the screw 64. Contact with the conductors 72 is established by means of a connector (not shown) similar to the connectors 48 of the FIGS. 1 to 5 embodiment.

The wiring of the support structure illustrated in FIG. 6 may, for example, be used to provide low voltage power to spot lights mounted on the U-section channel.

I claim:

1. A support structure which comprises an elongate slotted member defining a passage along the member and having slots therein at regularly spaced intervals, brackets which have teeth and are connected to the member by the teeth entering into the passage through the slots, and a conductor for carrying power and/or signalling to or from electrical equipment associated with the support structure, the conductor running along the passage and being electrically insulated from the support structure.

2. A support structure according to claim 1, wherein there is electrical contact with the conductor through a said slot which is unoccupied by a said tooth.

3. A support structure according to claim 2, which includes a plug-in electrical connector having a tongue which enters into the passage through a said slot which is unoccupied by a said tooth, the tongue carrying a terminal whereby electrical contact is established with the conductor.

4. A support structure according to claim 3, wherein the elongate slotted member comprises a slotted U-section channel having two rows of slots therein, the slots being arranged in laterally spaced pairs, and wherein the electrical connector has a pair of said tongues each entering into the passage through a corresponding one of the slots of a said pair of slots.

5. A support structure according to claim 4, which further comprises a conductor support extending along the passage, the conductor support being of an extruded material, and the conductor being supported by the conductor support.

6. A support structure according to claim 3, wherein the elongate slotted member comprises a pair of oppositely facing slotted U-section channels each having two rows of slots therein and the slots of each member being arranged in laterally spaced pairs, and a pair of side panels joining the U-section channels to form a four-sided passage with the U-section channels being on opposite sides of the passage, and wherein the electrical connector has a pair of said tongues each entering into the passage through a corresponding one of the slots of a said pair of slots.

7. A support structure according to claim 6, which further comprises a pair of conductor supports extending along the passage, the conductor supports each being of an extruded material and each carrying a said conductor, and a resiliently compressible material between the conductor supports and urging the conductor supports in opposite directions towards the corresponding U-section channels.

8. In a support structure which comprises an elongate slotted member defining a passage along the member and having slots therein at regularly spaced intervals, and brackets which have teeth and are connected to the member by the teeth entering into the passage through the slots, a method of providing the structure with a conductor for carrying power and/or signalling to or from equipment associated with the support structure, the method comprising inserting the conductor into the passage from an open end of the passage, and establishing contact with the conductor by entering a connector into the passage through a said slot which is not occupied by a said tooth.

* * * * *